(12) United States Patent
Rollins et al.

(10) Patent No.: US 7,237,190 B2
(45) Date of Patent: Jun. 26, 2007

(54) SYSTEM AND METHOD FOR GENERATING MULTIPLE CUSTOMIZABLE INTERFACES FOR XML DOCUMENTS

(75) Inventors: Sami Nicole Rollins, Arroyo Grande, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 09/799,698

(22) Filed: Mar. 7, 2001

(65) Prior Publication Data

US 2002/0129060 A1    Sep. 12, 2002

(51) Int. Cl.
*G06F 15/00* (2006.01)
(52) U.S. Cl. .................. 715/513; 715/524; 715/721
(58) Field of Classification Search ........... 715/513, 715/500, 523, 511, 524; 707/3, 7, 10, 100; 709/217, 218; 704/270.1; 345/810, 727; 717/114, 169, 105
See application file for complete search history.

(56) References Cited

U.S. PATENT DOCUMENTS

| | | | |
|---|---|---|---|
| 6,209,124 B1 * | 3/2001 | Vermeire et al. ........... 717/114 |
| 6,424,979 B1 * | 7/2002 | Livingston et al. ......... 715/511 |
| 6,487,566 B1 * | 11/2002 | Sundaresan ................. 715/513 |
| 6,631,519 B1 * | 10/2003 | Nicholson et al. .......... 717/169 |
| 6,687,873 B1 * | 2/2004 | Ballantyne et al. ......... 715/500 |
| 6,721,705 B2 * | 4/2004 | Kurganov et al. ....... 704/270.1 |
| 2002/0003547 A1 * | 1/2002 | Wang et al. ................ 345/727 |
| 2002/0026461 A1 * | 2/2002 | Kutay et al. ................ 707/523 |
| 2002/0057297 A1 * | 5/2002 | Grimes et al. .............. 345/810 |
| 2003/0212759 A1 * | 11/2003 | Wu ............................ 709/218 |
| 2005/0273759 A1 * | 12/2005 | Lucassen et al. ........... 717/105 |

OTHER PUBLICATIONS

Jake Sturm "Developing XML Solutions", Public Release Sep. 2, 2000, By Microsoft Press, Redmond, Washington, US, pp. 12, 53, 123, 260.*
Jake Sturm "Developing XML Solutions", Public Release Sep. 2, 2000, By Microsoft Press, Redmond, Washington, US pp. 23-27, pp. 123-139.*

* cited by examiner

*Primary Examiner*—Heather R. Herndon
*Assistant Examiner*—Quoc A. Tran
(74) *Attorney, Agent, or Firm*—Ramraj Soundararajan; IP Authority, LLC

(57) ABSTRACT

An XML schema and a set of user customization rules are utilized to produce a set of components that interact to provide a user-specific, document specific, multi-modal interface for an XML document. Each generated component provides a specific input and output mode. For example, one component could be an HTML component, which produces a HTML rendering of the XML tree while another component may be a speech component, which produces a speech-based rendering of the XML tree. A series of these components work together to produce a multi-modal view of the XML tree.

19 Claims, 12 Drawing Sheets

SYSTEM AND METHOD FOR GENERATING MULTIPLE CUSTOMIZABLE INTERFACES FOR XML DOCUMENTS

BACKGROUND OF THE INVENTION

1. Field of Invention

The present invention relates generally to the field of editing and browsing XML documents. More specifically, the present invention is related to a system and a method for generating multiple customizable interfaces for XML documents.

2. Discussion of Prior Art

The Internet and the World Wide Web (WWW) have an important and influential role in today's society. One of the most common authoring languages used to create documents on the WWW is the HyperText Markup Language or HTML. HTML is similar to the Standard Generalized Markup Language or SGML, although it is not a strict subset. HTML defines the structure and layout of a WWW document via tags and attributes.

One of the primary goals of HTML was to mark up information according to its meaning, without regard to how this information would actually be rendered in a browser. This is accomplished by using fundamental elements which hold various values. For example, the elements "TITLE", "H1", "EM" (or "STRONG"), and "ADDRESS" hold various values corresponding to the title, main header, emphasized text, and contact information of an author. Utilizing similar elements (other than the fundamental elements) like "FONT" to get a nice layout makes it cumbersome to present the information, and yet still maintain the best possible effect regardless of the user's environment. Added elements make the processing (at the viewer's end) of HTML documents difficult, or even impossible at times. Thus, the decision of how the viewer's browser displays titles, headers, etc., is best left to the browser, since it has access to the users' personal preferences and environment.

But, this is not the case because all the additional layout information is placed outside the HTML documents themselves. One common way to accomplish this is by placing these additional elements in a file called the CSS. CSS, or short for Cascading Style Sheets, is a feature that allows HTML authors and Web site developers to have control over how pages are displayed. With CSS, designers and users can create style sheets that define how different elements, such as headers and links, appear. These style sheets can then be applied to any Web page.

As a direct result of individualized styling of Web documents, a lot of pages now contain tagging written for a specific version of a specific browser (with default preferences) and a specific screen resolution. These pages are often more or less unreadable to those who use a different browser. Thus, HTML has turned into a language that is browser-specific.

Another pitfall associated with HTML is that it is a language that is not user-specific. Thus, it is not possible for a user to mark up information precisely based on its meaning (since a lot of the personalized elements needed are not available in HTML). For example, chemists who want special elements for chemical formulas or measurement data, are not able to do so. On the other hand, to expect a language to hold various elements involving a myriad of categories is not a feasible idea.

In addition to the above-mentioned shortcomings, HTML is not a structured language. To overcome these shortcomings, a new standard for the creation of markup language called XML was introduced.

XML or Extensible Markup Language, a specification developed by the W3C. XML is a pared-down version of SGML, designed especially for Web documents. It allows designers to create their own customized tags, enabling the definition, transmission, validation, and interpretation of data between applications and between organizations. XML is becoming the universal language for data on the Web. It gives developers the power to deliver structured data from a wide variety of applications to the desktop for local computation and presentation. XML allows the creation of unique data formats for specific applications. It is also an ideal format for server-to-server transfer of structured data. XML is a subset of SGML that provides a uniform method for describing and exchanging structured data in an open, text-based format, and may deliver this data by use of the standard HTTP protocol or other similar application layer protocols. XML is poised to supplement HTML as the standard Web formatting specification. At the present time, Microsoft® Internet Explorer version 5 handles XML using CSS while Netscape® is still experimenting with XML support.

XML allows the application programmer to specify a schema that defines the structure of any XML document that uses that schema. There are two ways to specify a schema, the first is XML schema, a developing standard that allows the application programmer to describe the schema using an XML document. XML schema also provides extended functionality such as data typing and inheritance. An alternative to XML schema is the document type definition (DTD). DTDs are written using a syntax different than that of XML schema and do not provide as much functionality.

Although XML has all these advantages, there are some limitations associated with the editing and browsing of XML documents. Existing XML editing and browsing tools produce a standard view of all XML documents. Specifically, most prior art systems lack a schema specific interface utilizing components to support multiple input and output modes. FIG. 1 illustrates a prior art scenario wherein XML schema 100 is analyzed by prior art system 102 (e.g., BeanMaker or Editormaker). Next, the system generates a single component 104 that helps create schema specific interface 106. Another prior art system, Xeena, provides for schema analysis as well as front end rendering. It should however be noted that all prior art systems mentioned above create schema specific interfaces based on only one component per schema. None of these systems generate mode specific components that can interact to produce multi-modal views of data.

In addition, some prior art methods allow specification of interfaces by creating an XML document conforming to a specified schema (e.g., UIML, VoiceXML). The problem with such methods is that they require a technical person to write the XML-based specification. This scenario is illustrated in FIG. 2, wherein user 200 hard codes XML-based specification 202, which is a custom XML document conforming to a specified schema and prior art system 204 utilizes document 202 to generate schema specific interface 206. It should however be noted that these prior art methods fail to automatically generate a specification based upon the schema.

Whatever the precise merits, features and advantages of the above prior art systems, none of them achieve or fulfills the purposes of the present invention. The present invention generates mode specific components that can interact to produce a user-specific, document specific, multi-modal interface. These and other objects are achieved by the detailed description that follows.

SUMMARY OF THE INVENTION

The present invention disclosure describes a system that, based upon an XML Schema and a set of user customization rules, will produce a set of components that interact to provide a user-specific, document-specific, multi-modal interface for an XML document. Each generated component provides a specific input and output mode. A series of the components work together to produce a multi-modal view of the XML tree. One component could be HTML component, which produces a HTML rendering of the XML tree while another component may be a speech-based rendering of the tree. The present system allows these multiple component views of the XML schema to work together.

The present invention thus allows for an intuitive method of interaction with XML data and also allows for the access for all users despite input/output restrictions. Furthermore, the method also allows users to customize an interface based upon their preferences.

DESCRIPTION OF THE PREFERRED EMBODIMENTS

Figure 1:
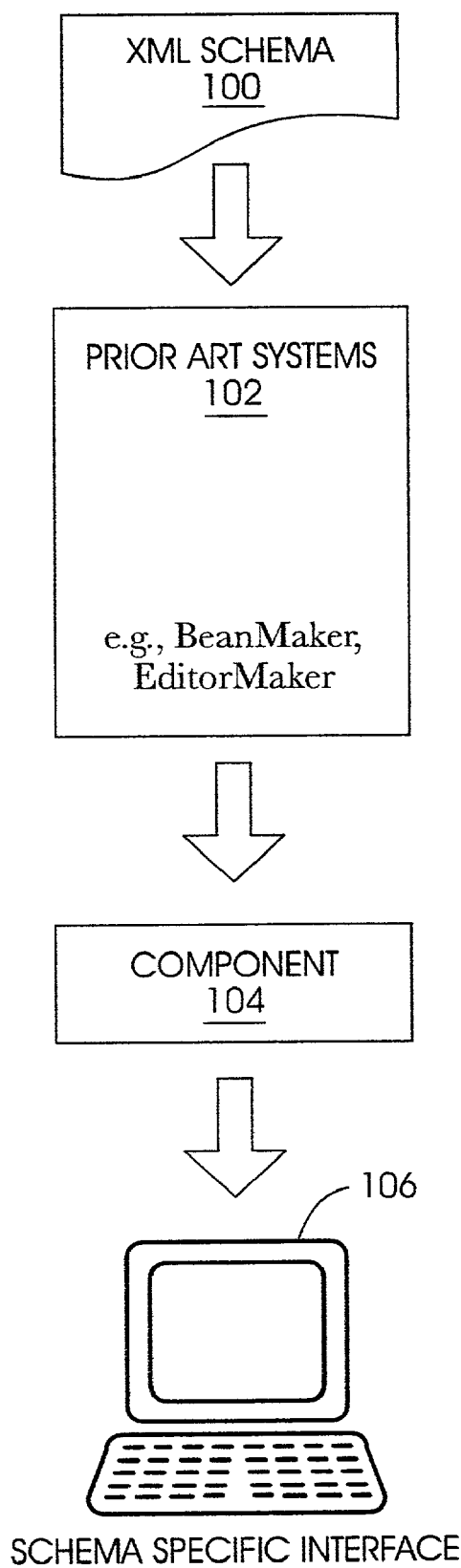
FIG. 1 illustrates a prior art system that generates a single component for a schema specific interface.
Figure 2:
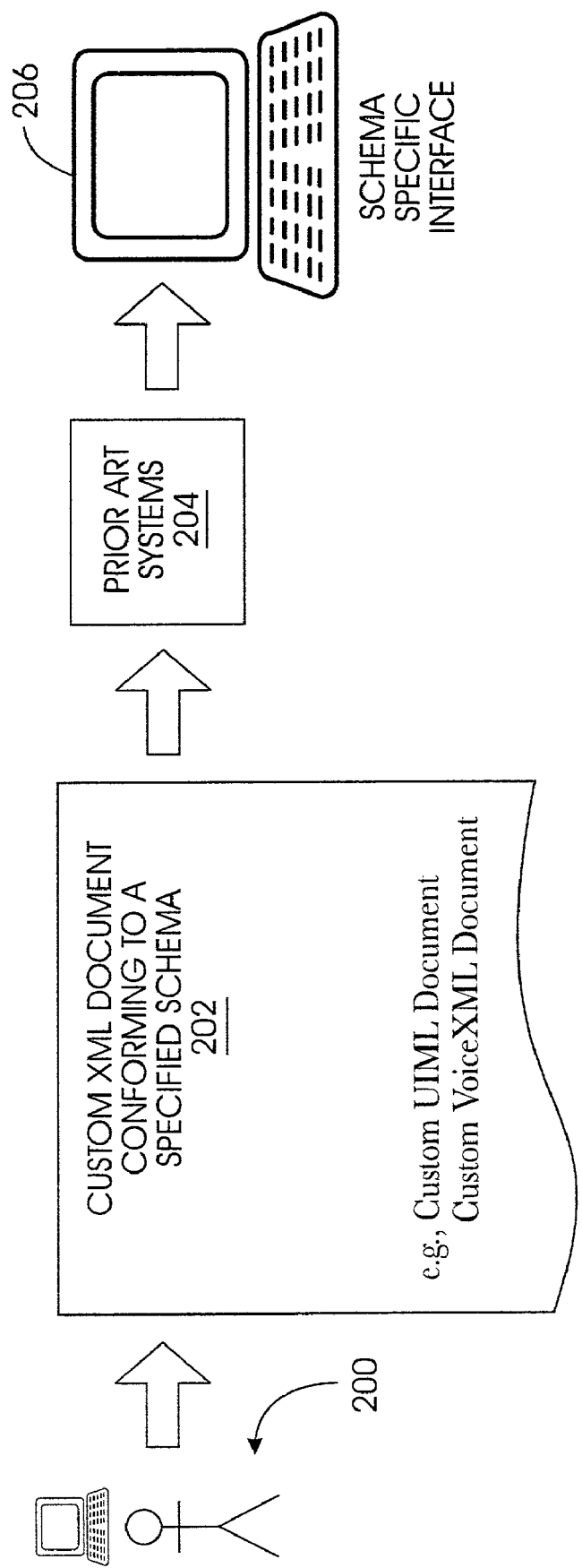
FIG. 2 illustrates a prior art system that requires a user to generate custom XML documents conforming to a specified schema.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

As described above, existing XML editing and browsing tools are limited in their support. They produce a standard view of all XML documents. The present invention provides for a method to navigate and modify XML data in an intuitive way. Such a method must provide a means to allow novice users as well as users of non-traditional computing devices (e.g., cellular phones) to access XML data.

Figure 3:
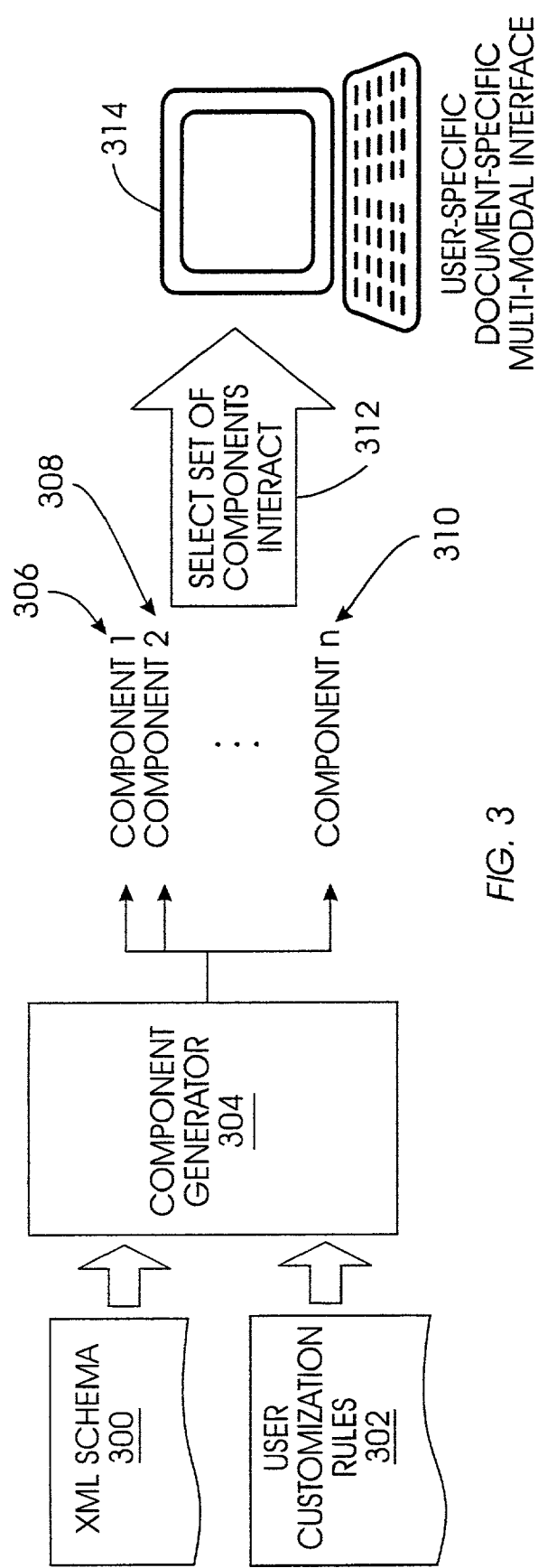
FIG. 3 illustrates a general overview of the present invention

FIG. 3 illustrates a general overview of the present invention. XML schema 300 and a set of user customization rules 302 are analyzed by component generator 304, which in turn generates a series of components: "component 1" 306, "component 2" 308, . . . , "component n" 310. As a next step, a select set of the generated components interact 312 to provide a user-specific, document specific, multi-modal interface 314. This is distinctly different from the prior art system described in FIG. 1 wherein only one component is generated.

Figure 4:
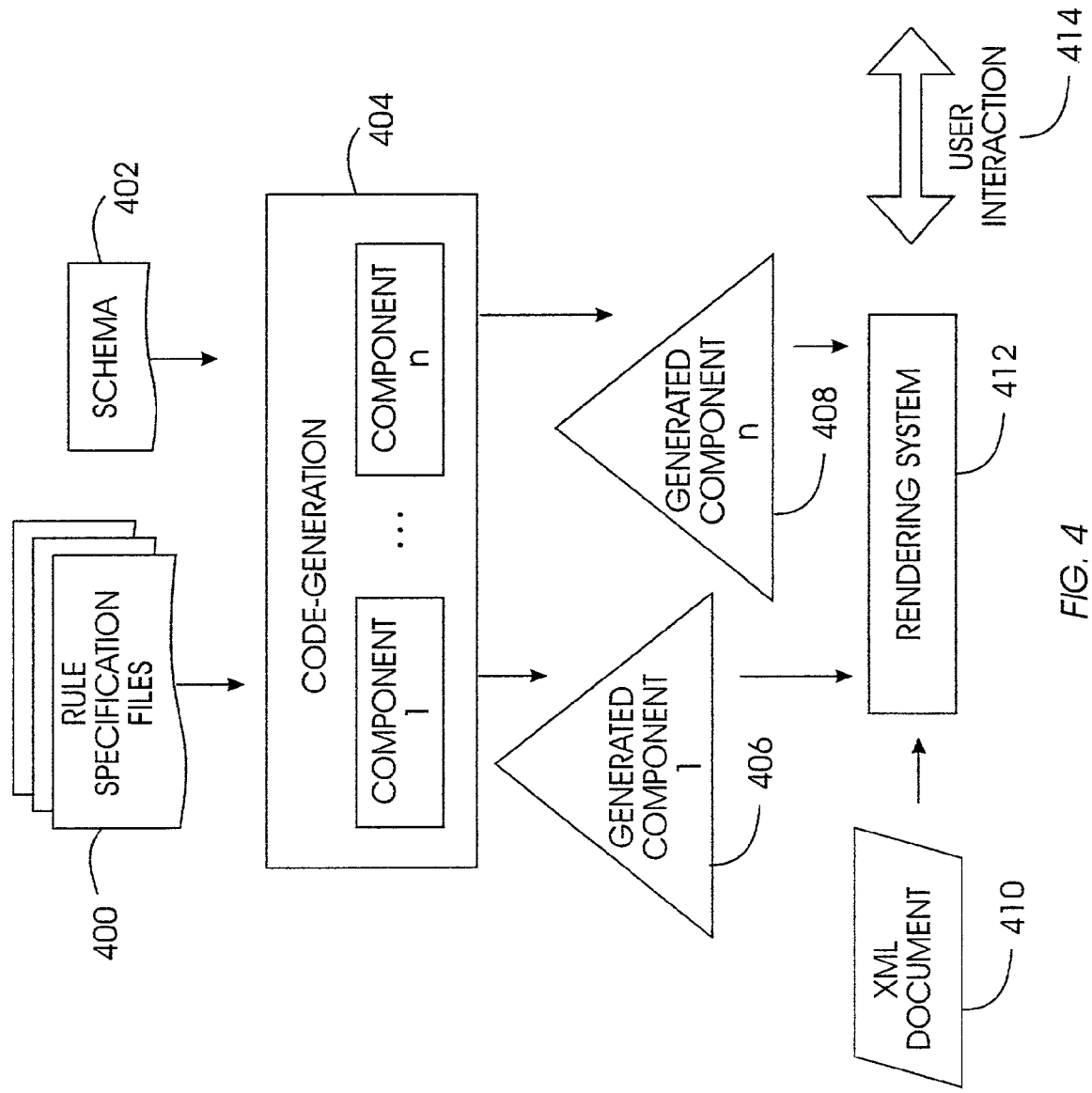
FIG. 4 illustrates a detailed overview of the current invention.

FIG. 4 illustrates a detailed overview of the current invention. Schema 402, and optionally rule specification files 400, are analyzed using code-generation algorithm 404. Code-generation algorithm 404 in turn produces a set of components ("component 1" 406 though "component n" 408) that interact to provide a user-specific, document specific, multi-modal interface for XML document 410. Each generated component provides a specific input and output mode. A series of the components then work together with rendering system 412 to produce a multi-modal view (via user interaction 414) of XML document 410. Rendering system 412 is responsible for controlled synchronized rendering (of the XML tree) and for interacting with user 414 to allow specialized input/output modes.

Hence, the present solution allows for an intuitive method of interaction with XML data and also allows access for all users despite input/output restrictions. Furthermore, the current method allows users to customize interface based upon preference.

Figure 5:
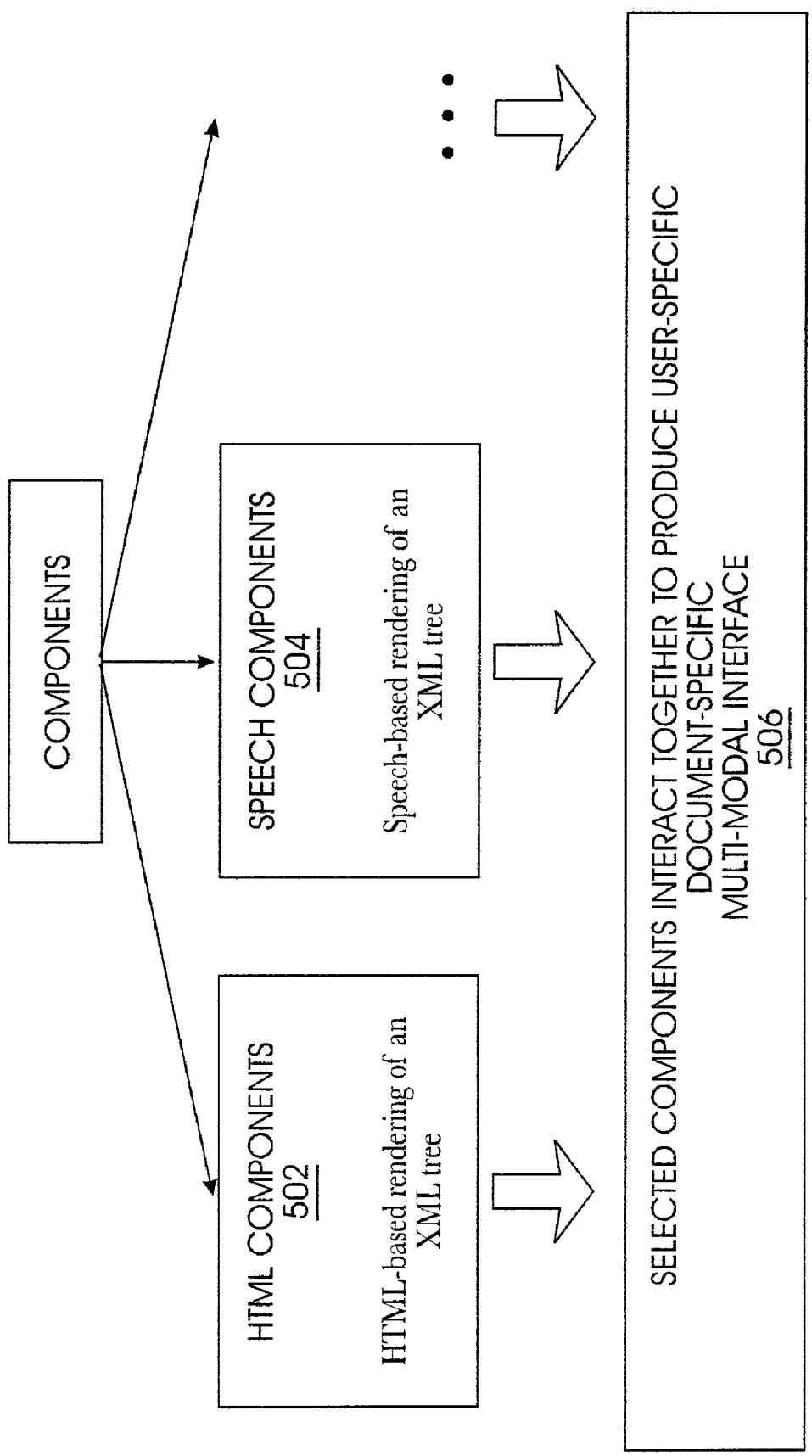
FIG. 5 illustrates examples of components as described in FIG. 3

FIG. 5 illustrates examples of the components described in FIG. 3 ("component 1" 306, "component 2" 308, . . . , "component n" 310) and FIG. 4 ("components 1" 406 though "component n" 408). In one embodiment, one component is an HTML component 502, which produces a HTML rendering of the XML tree. In another embodiment, the component is a speech component 504, which produces speech-based rendering of the XML tree. In a preferred embodiment, the present system allows multiple component views of the XML schema to work together to produce a user-specific, document specific, multi-modal interface 506.

Figure 6:
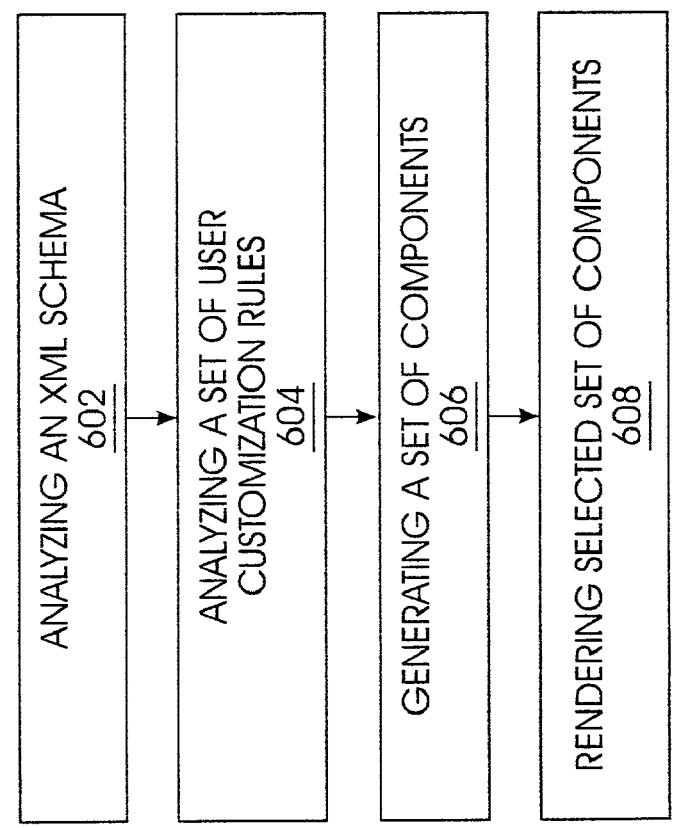
FIG. 6 illustrates the present invention's method for generating multiple customizable interfaces for XML documents.

FIG. 6 illustrates the present invention's method 600 for generating multiple customizable interfaces for XML documents. First, the present system analyzes an XML schema 602 and secondly, it optionally analyzes a set of user customization rules 604. Next, a set of components are generated via code-generation and last, a select set of components are rendered 608 via a rendering system which interacts with the user to allow specialized input/output modes.

Figure 7:
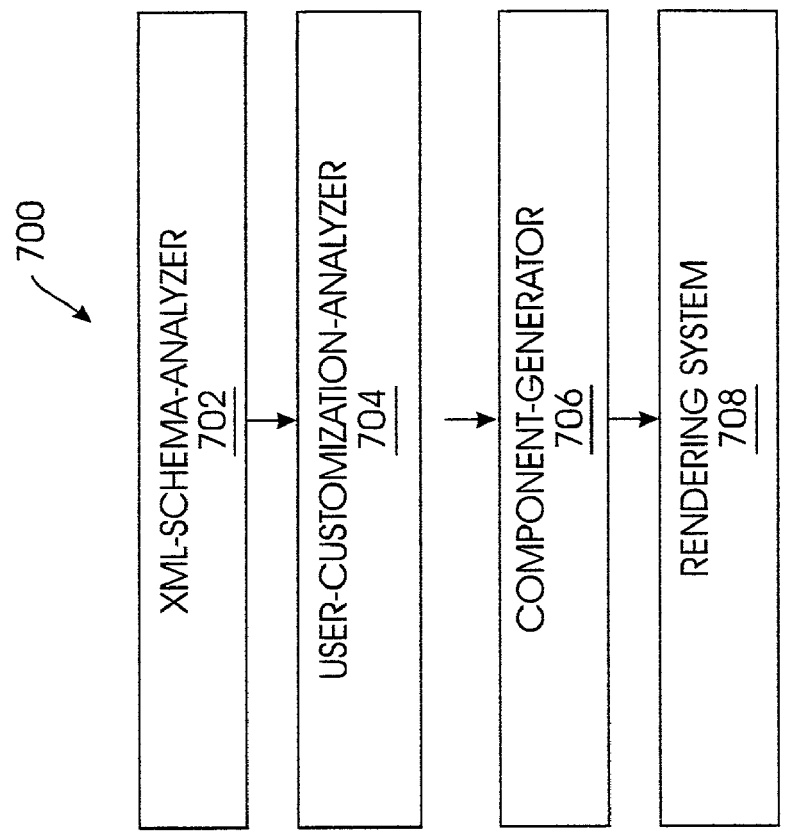
FIG. 7 illustrates the present invention's system for generating multiple customizable interfaces for XML documents.

FIG. 7 details a system 700 for generating multiple customizable interfaces for XML documents. First, XML-schema-analyzer 702 analyzes XML schema and next, user-customization-analyzer 704 optionally analyzes a set of rule specification files. As a next step, component-generator 706 generates components via code-generation. During code-generation, multiple components analyze a schema and a set of user-defined rules to produce a set of generated components that will allow a user to navigate and modify the XML data. Lastly, rendering system 708 renders a selected set of generated components wherein the generated components work together to present and modify XML data based upon user directives in the supported input modes.

Figure 8:
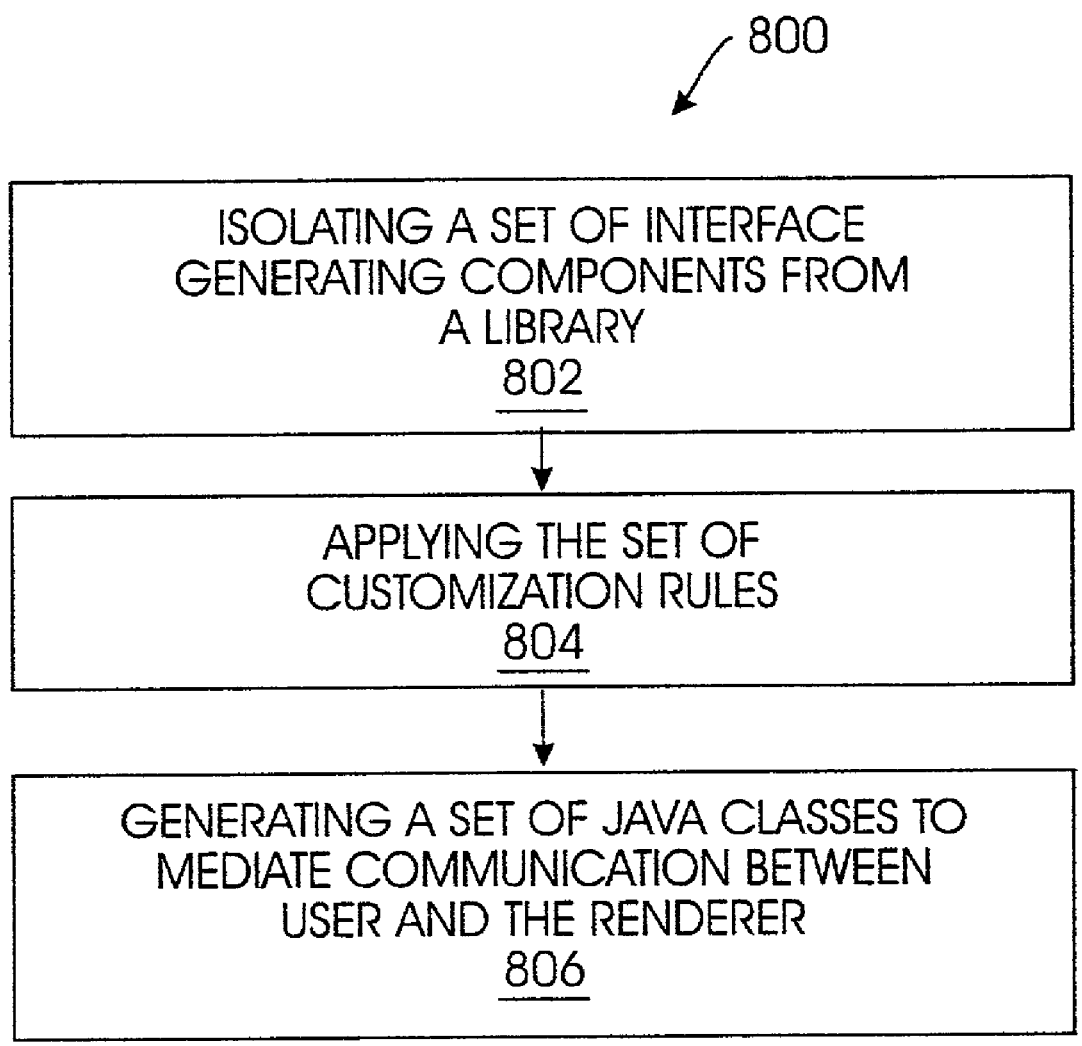
FIG. 8 illustrates the process of code-generation.
Figure 9:
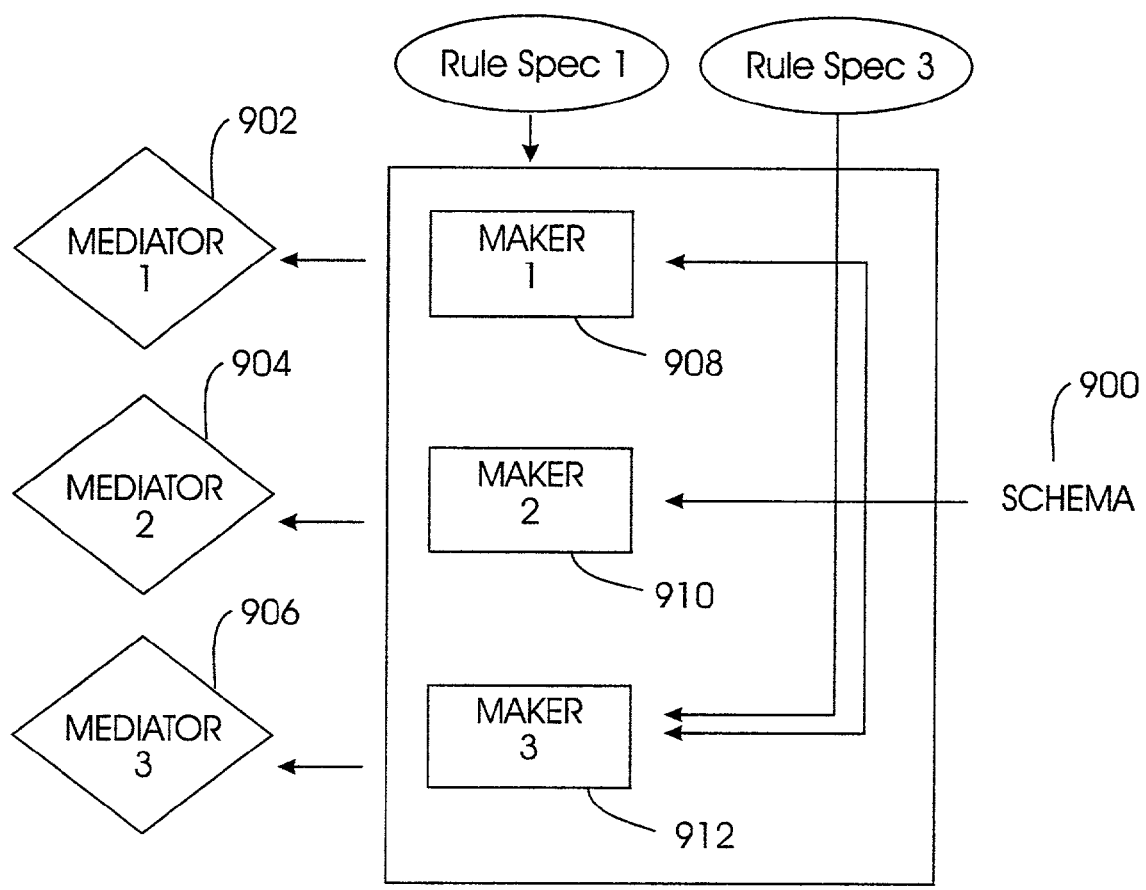
FIG. 9 illustrates the architecture of the mediator and maker interfaces.

The two important phases associated with the present system are: code-generation and rendering. FIG. 8 illustrates the first phase (code-generation) 800, wherein the user selects isolates a series of interface generating components from the library provided 802. To generate a customized interface, the user needs only to select those components that will be relevant to the runtime rendering scenario. Each component is responsible for making a specialized interface for an XML document and hence must implement the present invention's maker interface. In addition, the user may optionally specify a set of customization rules 804 that further define how the document will be rendered. The result of code-generation is a set of Java classes designed to mediate communication between the user and the synchronized tree manager 806. Therefore, the maker-generated classes should minimally implement our mediator interface. Since each mediator is designed to be independent of the others, the user needs only to select and invoke the mediators that are relevant to the current scenario and hence not incur the overhead of having to run all mediators simultaneously. The architecture of mediator and maker interfaces are illustrated in FIG. 9. During code-generation, each element declared in schema 900 is analyzed. For each element of schema 900, makers 908, 910, 912 are notified of the content model of the node. Based upon the content model, makers 908, 910, 912 will generate the portion of mediators 902, 904, 906 that will handle output rendering and input traversal and modification of a node with the given content model.

As an example, assume a maker were creating a Java Swing UI for an XML document of the given schema and furthermore, assume the following DTD:

<!ELEMENT PersonList (Name)*>
<!ELEMENT Name (EMPTY)>
<!ATTLIST Name
First CDATA #REQUIRED
Last CDATA #REQUIRED>

Figure 10:
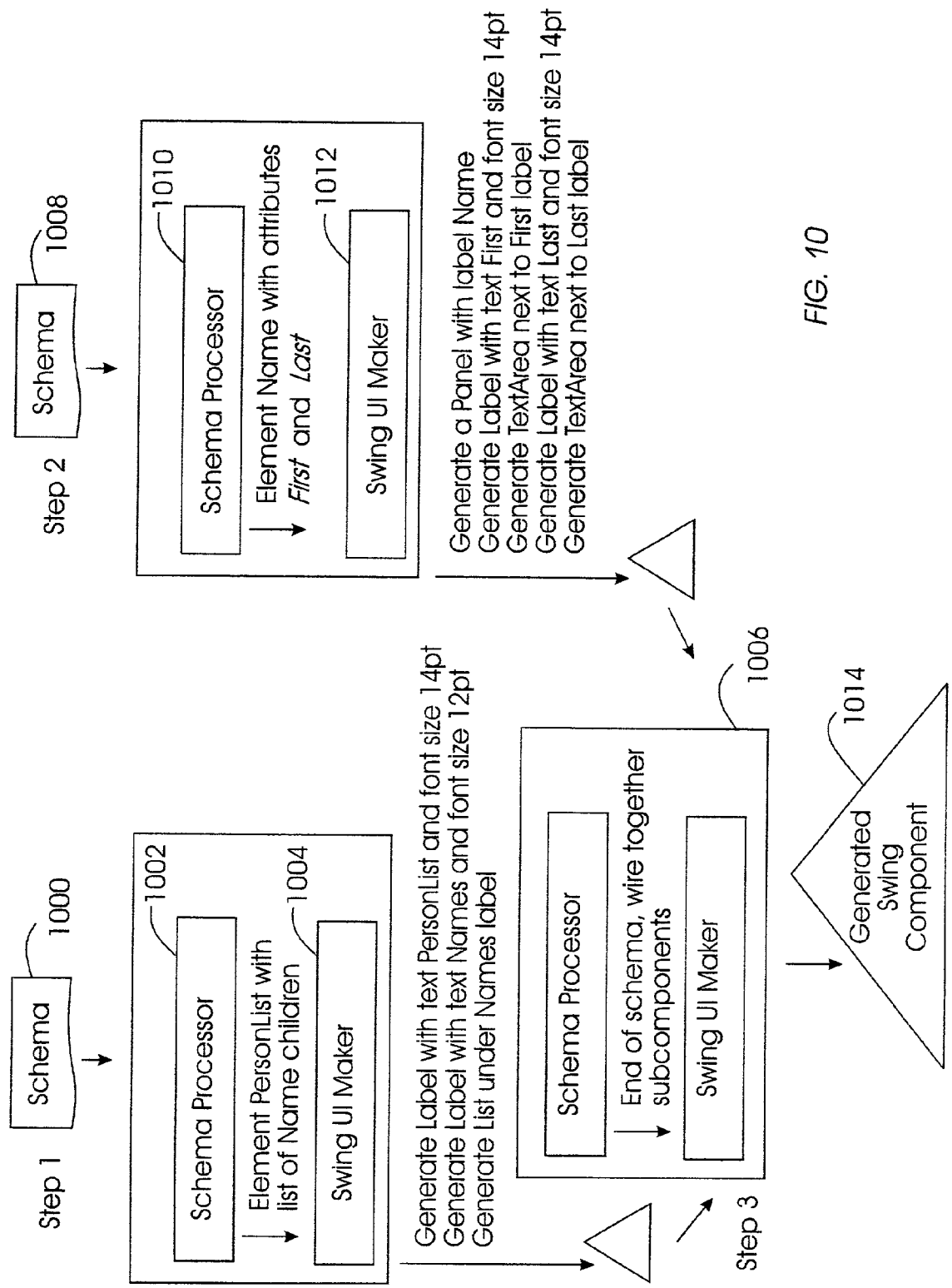
FIG. 10 illustrates code-generation for a sample document type definition.

Code-generation for this DTD would proceed as shown in FIG. 10. In step one, schema 1000 is analyzed by schema processor 1002, which along with Swing UI maker 1004 create a sub-component Java Swing UI for the XML document. In step two, schema 1008 is analyzed and further passed through schema processor 1010 and swing UI maker 1012 to create another sub-component Java Swing UI for the XML document. Lastly, in step three 1006, the system recognizes the end of schema and wires together the sub-components and swing component 1014 is generated.

Figure 11:
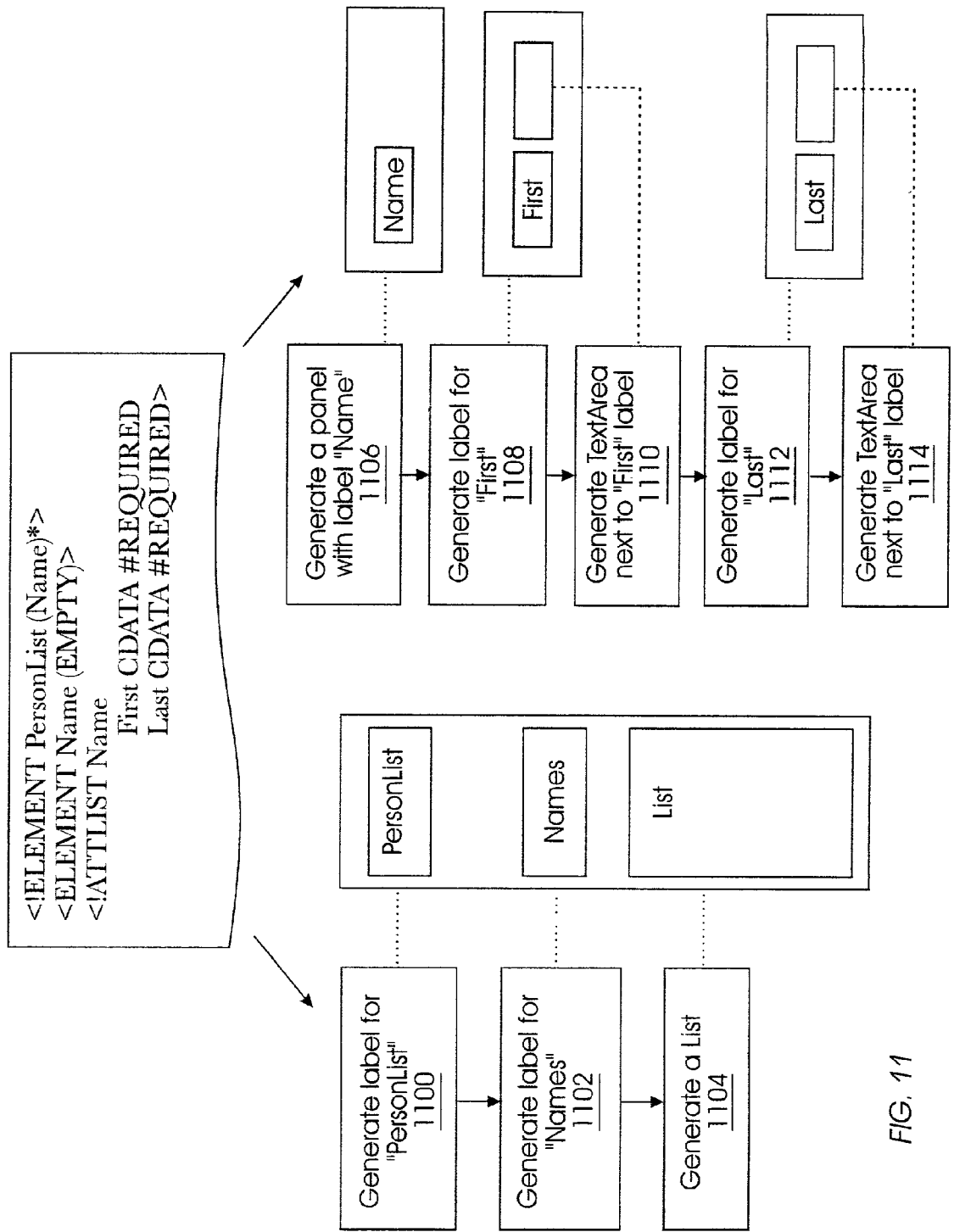
FIG. 11 illustrates how a schema is analyzed via steps one and two as shown in FIG. 10.

FIG. 11 illustrates in further detail how schema is analyzed via steps one and two as shown in FIG. 10. In step one, first, a label for "PersonList" is generated 1100 and next, a label for "Names" is created 1102. Finally, a list is also generated 1104. In step two, first, a panel with label "Name" is generated 1106 and next, a label for "First" is generated 1108. As a next step, a text area is created right next to the label "First" 1110 and a new label called "Last" is generated 1112. Lastly, a text area near the label "Last" is generated 1114. As described above, these sub-components, generated via these two steps, are wired together to create a swing component.

Figure 12:
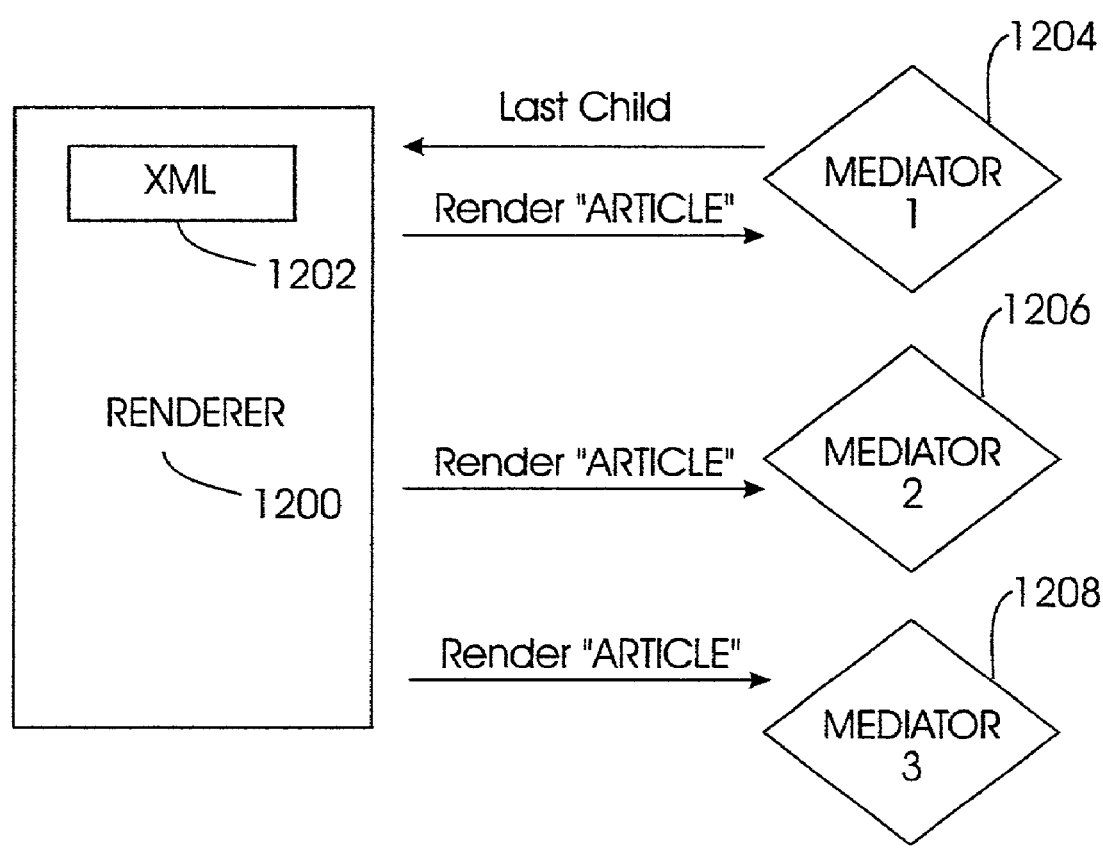
FIG. 12 illustrates the architecture of the rendering system.

The second important phase of the present invention's system is rendering. The architecture of the rendering system is provided in FIG. 12. The system includes renderer 1200 that is responsible for controlling synchronized rendering of XML tree 1202. Each mediator 1204, 1206, 1208 acts as an intermediary between the renderer 1200 and the user allowing its own specialized input and output mode. Moreover, mediators 1204, 1206, 1208 provides the capability to follow links between XML documents.

The Renderer defines the concept of a cursor. At any given point, all of the registered mediators should be rendering the portion of the tree pointed to by the cursor. When the cursor is moved, the new view of the tree should be rendered. However, it is possible that a mediator will have to move the cursor more than one time to achieve the desired view. This is because the methods to move the cursor are generally incremental and somewhat limited. To accommodate this situation, the renderer implements a locking mechanism. Before calling a method that will move the cursor, the given mediator must acquire the lock. After all movement is complete, the lock should be released. When the lock is released, all of the mediators are notified that the cursor has changed. If a mediator directs that a link be followed, the renderer will follow the link and possibly instantiate new mediators if necessary.

To illustrate rendering using an example, the following document is used:

<PersonList >
<Name First="Mickey" Last="Mouse"/>
<Name First="Donald" Last="Duck"/>
<Name First="Minnie" Last="Mouse"/>
</PersonList >

Figure 13:
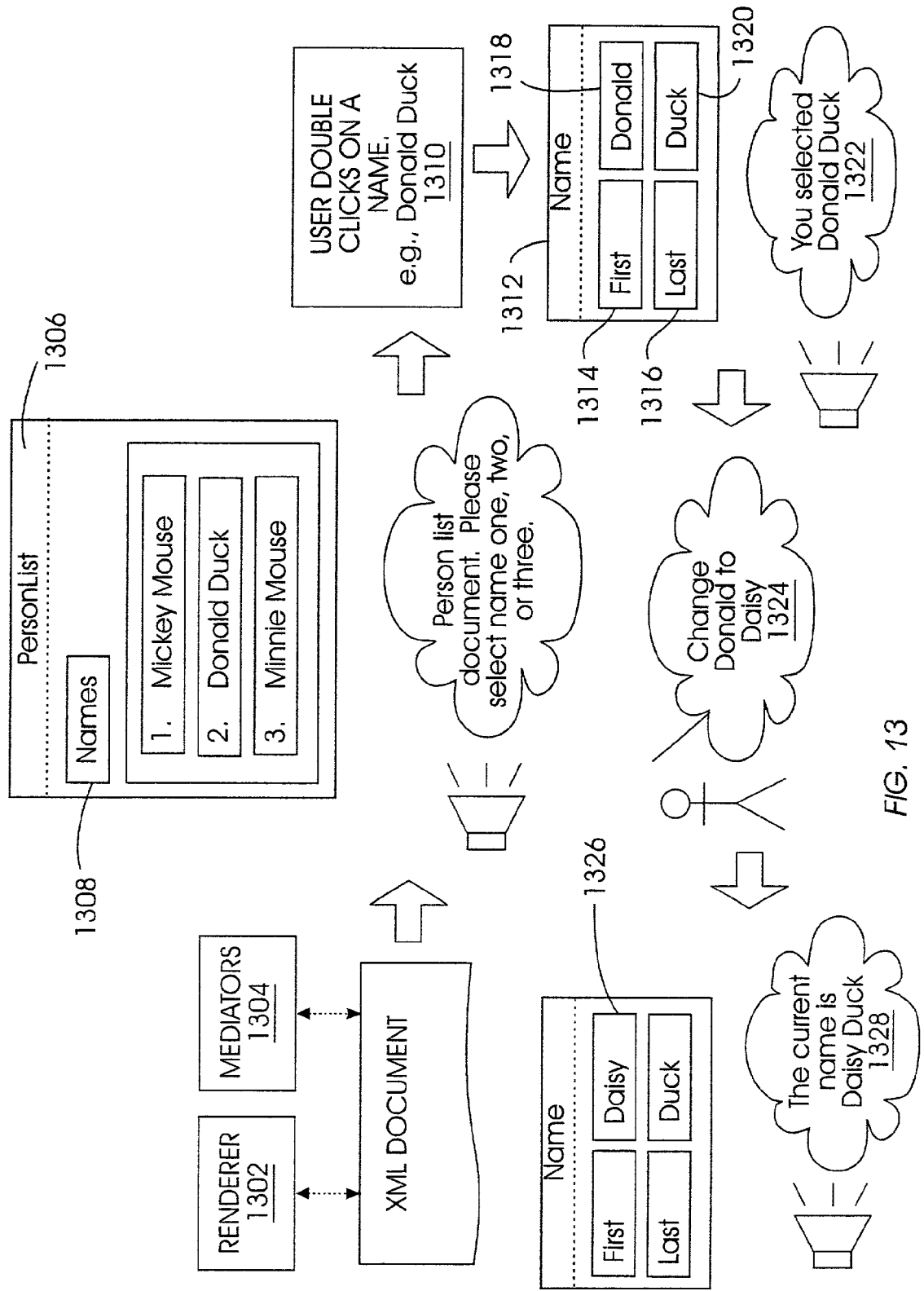
FIG. 13 illustrates rendering of a sample code based on the system of the present invention.

In this example, the mediators includes a Swing UI (discussed in the schema analysis example) and an aural mediator that provides speech-based input and output for the user. FIG. 13 illustrates, in one embodiment, how this scenario might proceed. First, the user opens document using renderer 1302 and two mediators 1304. Second, the user sees a frame with the label "PersonList" 1306 and under this is label "Names" 1308 and a list containing the text, "Mickey Mouse, Donald Duck, Minnie Mouse". In addition, the user hears, "Person list document. Please select name one, two, or three." Then, the user double clicks on "Donald Duck" 1310 and a frame appears containing label "Name" 1312 under which are two more labels, "First" 1314 and "Last" 1316. Next to "First" is the name "Donald" 1318 and next to last is the name 'Duck" 1320. The user then hears, "You selected Donald Duck" 1322. Furthermore, the user says "Change Donald to Daisy" 1324 and the text area previously containing "Donald" now changes to "Daisy" 1326. In addition, the user hears, "The current name is Daisy Duck" 1328 and the user says 'Exit' and the program exits.

The above system and its described functional elements are implemented in various computing environments. For example, the present invention may be implemented on a conventional IBM PC or equivalent, multi-nodal system (e.g., LAN) or networking system (e.g., Internet, WWW, Wireless Web). All programming and data related thereto are stored in computer memory, static or dynamic, and may be retrieved by the user in any of. conventional computer storage, display (i.e., CRT) and/or hardcopy (i.e., printed) formats. The programming of the present invention may be implemented by one of skill in the art of XML programming.

CONCLUSION

A system and method has been shown in the above embodiments for the effective implementation of a system and method for generating multiple customizable interfaces for XML documents. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware. In addition, the specific chosen components are representative of the preferred embodiment and should not limit the scope of the invention. The invention could be practiced locally or across networks, including, but not limited to, LANs, WANs, WWW, Internet, cellular, satellite, virtual, etc.

The invention claimed is:

1. A computer-based method for generating multiple customizable interfaces for an XML document, said method comprising the following steps:

analyzing an XML schema;

analyzing a set of user customization rules;

generating a set of components via code-generation from said analyzed XML schema and said analyzed user customization rules, wherein each of said components implement a specific input and output mode, said code-generation further comprising the step of isolating a set of interface generating components from a library, with said set of components generated based on said interface generating components and said customization rules, and passing said generated set of components to a rendering system, wherein said rendering system utilizes said generated components, and their specific input and output modes, to navigate and modify the XML document.

2. A computer-based method for generating multiple customizable interfaces for an XML document, as per claim 1, wherein said step of utilizing generated components further comprises utilizing only a subset of said generated components.

3. A computer-based method for generating multiple customizable interfaces for an XML document, as per claim 1, wherein one of said set of generated components is an HTML component which provides an HTML-based rendering of said XML document.

4. A computer-based method for generating multiple customizable interfaces for an XML document, as per claim 1, wherein one of said generated components is a speech component which provides a speech-based rendering of said XML document.

5. A computer-based method for generating multiple customizable interfaces for an XML document, as per claim 1, wherein said generated components are JAVA classes.

6. A computer-based interfaces for an XML document, as per claim comprises of the steps of:

passing said schema and said user customization rules into a set of maker interfaces, and generating mediator interfaces corresponding to said set of maker interfaces, wherein said makers generate mediators that handle output rendering.

7. A computer-based system for generating multiple customizable interfaces for an XML document, said computer-based system implemented in computer readable program code stored in computer memory comprising:

an XML-schema-analyzer which analyzes an XML schema;

a user-customization-analyzer which analyzes a set of user customization rules;

a component-generator which, based on said analyzed XML schema and user customization rules, generates a set of components via code-generation, said component generator further comprising an isolator to isolate a set of interface generating components from a library, with said set of components generated based on said interface generating components and said customization rules, and a rendering system which selects a subset of said generated components and utilizes their specific input and output modes, to navigate and modify the XML document.

8. A computer-based system for generating multiple customizable interfaces for an XML document, as per claim 7, wherein said computer-based system is implemented locally or remotely on one or more computer-based systems.

9. A computer-based system for generating multiple customizable interfaces for an XML document, as per claim 7, wherein said computer-based system is implemented across networks comprising any of LANs, WANs, cellular, Internet or Web-based networks.

10. A computer-based system for generating multiple customizable interfaces for an XML document, as per claim 7, wherein one of said set of generated components is an HTML component which provides an HTML-based rendering of said XML document.

11. A computer-based system for generating multiple customizable interfaces for an XML document, as per claim 7, wherein one of said set of generated components is a speech component which provides a speech-based rendering of said XML document.

12. A computer-based method of generating multiple customizable interfaces for an XML document, said method comprising the following steps:

analyzing an XML schema;

analyzing a set of user customization rules;

generating a set of components via code-generation from said analyzed XML schema, wherein each of said components implement a specific input and output mode, said set of components generated based on said analyzed set of user customization rules, with at least one of said generated components being a speech component that provides a speech-based rendering of said XML document;

passing said generated set of components to a rendering system, and wherein said rendering system utilizes said generated components, and their specific input and output modes, to navigate and modify the XML document.

13. A computer-based method for generating multiple customizable interfaces for an XML document, as per claim 12, wherein said step of utilizing generated components further comprises utilizing only a subset of said generated components.

14. A computer-based method for generating multiple customizable interfaces for an XML document, as per claim 12, wherein one of said set of generated components is an HTML component which provides an HTML-based rendering of said XML document.

15. A computer-based system for generating multiple customizable interfaces for an XML document, said computer-based system implemented in computer readable program code stored in computer memory comprising:

an XML-schema-analyzer which analyzes a XML schema;

a user-customization-analyzer which analyzes a set of user customization rules;

a component-generator which based on said analyzed XML schema and said user customization rules, generates a set of components via code-generation, with at least one of said set of generated components being a speech component which provides a speech-based rendering of said XML document, and a rendering system which selects a subset of said generated components and utilizes their specific input and output modes, to navigate and modify the XML document.

16. A computer-based system for generating multiple customizable interfaces for an XML document, as per claim 15, wherein said computer-based system is implemented locally or remotely on one or more computer-based systems.

17. A computer-based system for generating multiple customizable interfaces for an XML document, as per claim 15, wherein said computer-based system is implemented across networks comprising any of LANs, WANs, cellular, Internet or Web-based networks.

18. A computer-based system for generating multiple customizable interfaces for an XML document, as per claim 15, wherein one of said set of generated components is an HTML component which provides an HTML-based rendering of said XML document.

19. An article of manufacture comprising a computer user medium having computer readable code embodied therein which generates multiple customizable interfaces for an XML document, said article comprising:

computer readable code which analyzes an XML schema;

computer readable code which analyzes a set of user customization rules;

computer readable code which, based on said analyzed XML schema and user customization rules, generates a set of components via code-generation, said code-generation further comprising isolating a set of interface generating components from a library, and obtaining said set of customization rules, wherein said set of components are generated based on said interface generating components and said customization rules to mediate communication between a user and a rendering system, and computer readable code which selects a subset of said generated components and utilizes their specific input and output modes, to navigate and modify the XML document.

* * * * *